Aug. 12, 1969   R. A. STEPHENS   3,460,283
INFLATABLE WATER-FOWL DECOY
Filed Nov. 2, 1967
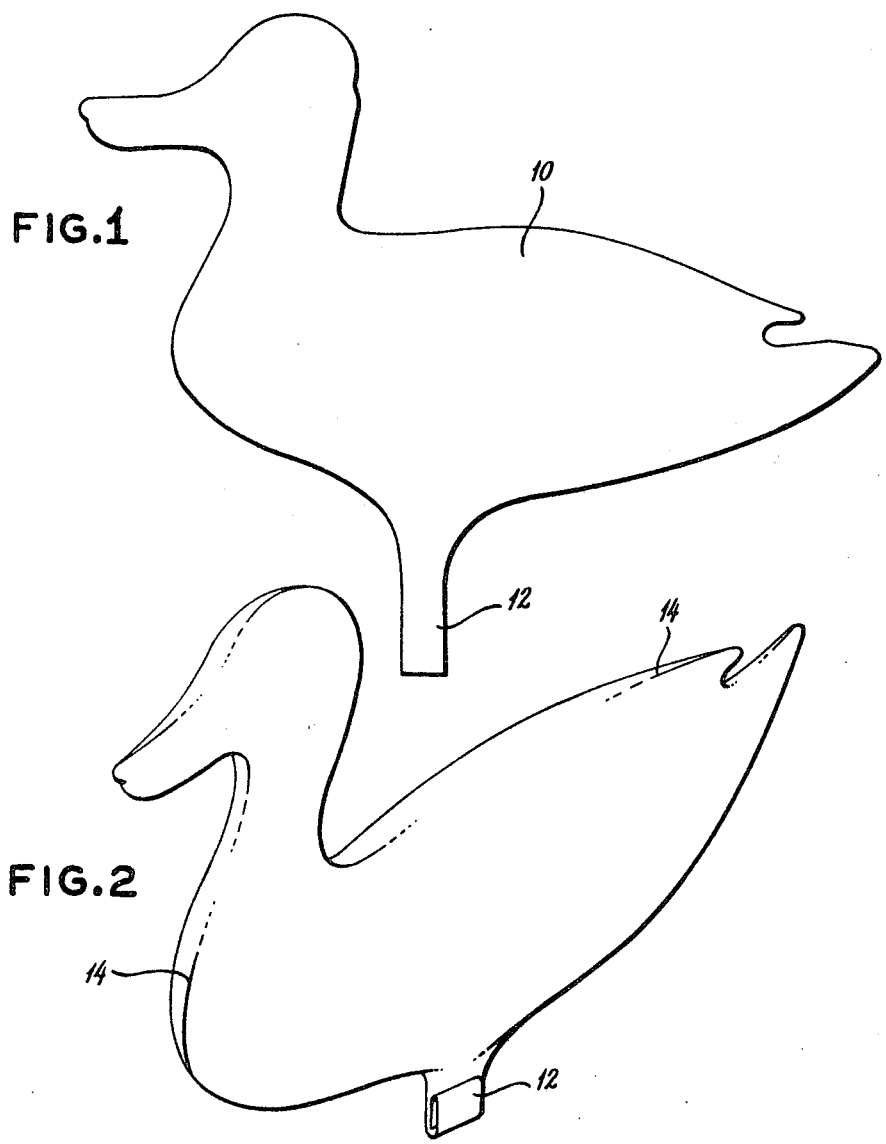
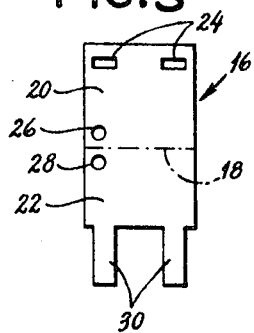
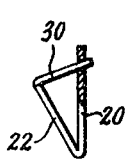
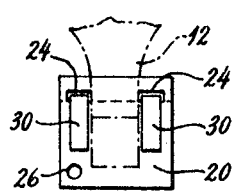
INVENTOR
ROBERT A. STEPHENS
BY
COLTON & STONE
ATTORNEYS

United States Patent Office 3,460,283
Patented Aug. 12, 1969

3,460,283
INFLATABLE WATER-FOWL DECOY
Robert A. Stephens, c/o Javelin Oil Co., Suite 602, Petroleum Tower, P.O. Box 302, Shreveport, La. 71102
Filed Nov. 2, 1967, Ser. No. 680,168
Int. Cl. A01m 31/06
U.S. Cl. 43—3            6 Claims

ABSTRACT OF THE DISCLOSURE

An inflatable water-fowl decoy formed from a plastic material. The decoy has a stem, by means of which it may be inflated, extending from the bottom thereof at a point forward of the center of gravity. Sealing of the inflated decoy is accomplished by crimping a metallic combination keel, seal and anchor attachment means about the stem.

BACKGROUND OF THE INVENTION

Field of the invention

The present invention relates to water-fowl decoys. More particularly, the present invention is directed to an inflatable decoy and sealing means therefor. Accordingly, the general objects of the present invention are to provide new and improved apparatus of such character.

Description of the prior art

Decoys to lure game birds, particularly water-fowl, within the range of the hunter have long been known. Initially, decoys were carved from wood making their manufacture a tedious process. Wooden decoys, thus, have been rather expensive and in recent years have become curios. This was to be expected since the wooden decoy was also difficult to transport due to its size and weight.

The carved wooden decoy was superseded by the decoys formed from compositions such as treated paperboard. While these second generation decoys helped to overcome the weight and, to some extent, the cost disadvantages of the wooden decoy, transportation thereof to the hunting site remained a problem. In addition, decoys molded from composition materials have had a tendency to become waterlogged with time and thus, even considering their rather moderate cost, these articles still presented a rather substantial expense to the hunter.

In recent years, efforts have been directed to perfecting an inflatable decoy having suitable characteristics. Because of their design, previous inflatable decoys have not simulated the action of an actual bird resting on a water surface when the surface had any substantial degree of roughness. Prior art decoys, depending on the length of their anchor lines, would either turn on their sides or be pulled down to the point where they were partially submerged. Also, prior art inflatable decoys, when used in groups, could not all be cause to continue to face in the proper direction, which is headed into the wind, thus presenting a natural looking grouping on the water. As a further disadvantage of prior art inflatable decoys, the devices presented a problem with regard to the attachment of an anchor line. Attempts to attach the anchor line to the plastic material from which the decoys have been formed have been completely unsuccessful due to tearing of the material.

SUMMARY OF THE INVENTION

The present invention overcomes the above-discussed disadvantages of the prior art by providing a novel, inflatable water-fowl decoy comprised of a single piece of suitably imprinted or impregnated plastic material. When not in use, the decoy of the present invention may be folded flat into a package approximately the size of a handkerchief. The decoy of the present invention has a stem or tube extending from the bottom thereof forward of the center of gravity, the decoy being inflated through the stem. When inflated, the decoy may be sealed by rolling up the stem and clamping it closed by means of a soft lead keel weight. The anchor line for the decoy is attached to the keel weight. The size and shape of the decoy coupled with the placement of the inflating stem will, with the keel weight in place, cause the decoy to float naturally and to turn so as to always be facing into the wind.

BRIEF DESCRIPTION OF THE DRAWING

The present invention may be better understood and its numerous advantages will become apparent to those skilled in the art by reference to the accompanying drawing wherein like reference numerals refer to like elements in the various figures and in which:

FIGURE 1 is a side view of a preferred embodiment of a duck decoy in accordance with the present invention, the decoy being in the uninflated condition.

FIGURE 2 is a perspective view of the decoy of FIGURE 1 after inflation with the inflating stem rolled up but not as yet clamped closed.

FIGURE 3 is a top view of a preferred embodiment of a combined inflating tube clamp and keel weight in accordance with the present invention.

FIGURE 4 is a side view, partly in section of the clamp of FIGURE 3 in the partly closed position.

FIGURE 5 is a side view of the clamp of FIGURES 3 and 4 in position on the inflating stem of the decoy of FIGURES 1 and 2.

DESCRIPTION OF THE PREFERRED EMBODIMENT

Referring now to FIGURE 1, an inflatable-deflatable waterfowl decoy is shown having a main body portion 10 and, extending from the bottom thereof, a tube or stem 12 through which air may be injected for inflation purposes. The decoy of the present invention will preferably be comprised of a plastic, such as polyvinyl chloride, which is light in weight and which may be folded or rolled into a small package thereby enabling a hunter to carry a large number of decoys. A further advantage of using polyvinyl chloride is that this material is very tough and durable and thus will withstand extreme stresses brought about by the pounding of high waves and surf. As shown in FIGURE 1, the decoy is uninflated thus forming a flat package. The plastic material comprising body portion 10 of the decoy will be imprinted or otherwise suitably colored so as to approximate the appearance of the species of water-fowl that it is desired to attract. The coloration of the decoy will be performed prior to the sealing together of two identical pieces of plastic material along line 14, see FIGURE 2, to form a decoy of one piece design and construction.

When it is desired to place the decoy, the package will be unrolled or unfolded so as to provide access to flexible stem 12. The decoy may then be inflated by mouth or, if available, with a compressed air source. Once inflated, stem 12 will be rolled or folded up, as shown in FIGURE 2, so as to be sealed off thereby preventing air from escaping from the inflated decoy.

Referring now to FIGURE 3, a keel weight and clamp of novel design is indicated generally at 16. Keel 16 will typically be comprised of a soft metal such as lead which may be die stamped to provide the flat piece shown in FIGURE 3. The flat lead piece is scored so as to facilitate folding about line 18. Folding of the keel weight about line 18 results in two oppositely disposed side pieces 20 and 22. Piece 20 has a pair of holes 24—24 adjacent the end thereof and a third hole 26 adjacent the point of folding. The other side piece 22 has a hole 28 which will be in registration with hole 26 when the keel weight is folded about line 18. Side piece 22 also has a pair of tabs 30—30 extending from the end thereof.

As may be seen from FIGURE 4, tabs 30—30 are bent so as to be perpendicular to the remainder of portion 22 of the keel weight. In this position, when the keel weight is folded about line 18, tabs 30—30 will pass through holes 24—24 in portion 20. Accordingly, upon the closing of the gap between side portions 20 and 22, tabs 30—30 may be folded downwardly to lock the keel weight tightly closed.

With the keel weight in the partially closed position of FIGURE 4, the folded over portion of stem 12 is inserted between tabs 30—30 and into the space between side portions 20 and 22. Thereafter, side portions 20 and 22 are pushed together as tightly as possible and tabs 30—30 folded downwardly against the outside of side portion 20 to lock the keel weight in the closed position over folded stem 12. This locked position of the keel weight is shown in FIGURE 5. The clamping of the stem 12 by keel weight 16 will seal stem 12 and prevent leakage of air from the decoy. It is also to be noted that, since the folded over portion of stem 12 is inserted into the space between side portions 20 and 22 of the keel weight to a position past the junction of tabs 30—30 and side portion 22, the closing of the keel weight will reduce the gap through which the folded over portion of stem 12 has been inserted to a width approximately equal to the width of stem 12 in the uninflated condition. Accordingly, the stem is securely retained within the keel weight and there can be no accidental slippage of the keel weight off the stem.

The position of stem 12 with respect to main body portion 10 of the decoy is particularly noteworthy. Stem 12 is formed so as to be just slightly forward of the center of gravity of the decoy. Accordingly, with weight 16 in place, any wind acting on the decoy will cause it to turn so as to always head into the wind. The overall light weight and buoyancy of the decoy will give it a more life-like action when riding on the water's surface while the presence of the keel weight and its location will cause the decoy to assume the position normally assumed by the water-fowl and will prevent tipping of the decoy.

Returning to FIGURE 5, anchor of the decoy is accomplished by passing an anchor line through aligned holes 27 and 28 in keel weight 16. Thus, the anchor line does not contact the plastic material and cannot tear loose. Because of the light weight and buoyancy of the decoy, the size of the anchor weights which must be carried is reduced to an absolute minimum.

As will now be apparent to those skilled in the art, a novel water-fowl decoy possessing superior properties to those previously proposed has been invented. The decoy of the present invention is characterized by an inflatable body portion and a member which acts as a seal for the body portion, a keel for balancing the decoy and a tie down for anchor lines. Due to the position of attachment of the keel weight to the decoy and the weight thereof, the decoys will be pulled down in the water so that they will have a natural resemblance to live water-fowl and will always head into the wind.

While a preferred embodiment has been shown and described, various modifications and substitutions may be made thereto without departing from the spirit and scope of this invention. Accordingly, the present invention has been shown by way of illustration and not limitation.

What is claimed is:

1. A light weight, inflatable water-fowl decoy comprising:
   an inflatable body portion which assumes the shape of a water-fowl when inflated;
   a stem through which gas may be injected into the interior of said body portion, said stem extending from the underside of said body portion; and
   a weighted metallic keel member comprising an initially flat body of soft metal, said body being bent intermediate the ends thereof and having a pair of spaced tabs extending from one end and engaging the opposite end thereof, said stem being inserted into the space defined between said spaced tabs and clamped in a closed position between opposite ends of said keel member thereby to maintain said body portion in an inflated condition.

2. The article of claim 1 wherein said stem comprises:
   a flexible tube which communicates at one end with the interior of said body portion, said tube extending from the underside of said body portion at a point forward of the center of gravity thereof.

3. The article of claim 2 wherein the body of said metallic member comprises:
   a pair of holes adjacent the end thereof opposite the spaced tabs, said body being foldable intermediate said ends to pass said tabs through said holes, said flexible tube being partially folded on itself and inserted between said tabs and intermediate the folded portions of said flat body whereby said keel will be secured to said tube by folding said tabs over after passage through said holes.

4. The article of claim 3 wherein said soft metal body further comprises:
   a second pair of holes, said holes of said second pair being disposed on opposite sides of the line about which said body is folded whereby said holes of said second pair are in registration when said keel is secured to said tube, said second pair of holes thus providing means for the attachment of an anchor line to said decoy.

5. The article of claim 4 wherein said inflatable body portion comprises:
   first and second pieces of polyvinyl chloride sealed about their peripheries to form an air tight, inflatable body.

6. The article of claim 1 wherein said inflatable body portion is comprised of polyvinyl chloride.

References Cited

UNITED STATES PATENTS

| | | | |
|---|---|---|---|
| 1,037,406 | 9/1912 | Albers | 273—65 |
| 1,201,045 | 10/1916 | Head | 46—90 |
| 2,245,267 | 6/1941 | Elfstrand | 43—3 |
| 3,254,439 | 6/1966 | Hansen | 43—3 |

WARNER H. CAMP, Primary Examiner